US011061672B2

(12) United States Patent
Elmer et al.

(10) Patent No.: US 11,061,672 B2
(45) Date of Patent: Jul. 13, 2021

(54) CHAINED SPLIT EXECUTION OF FUSED COMPOUND ARITHMETIC OPERATIONS

(71) Applicant: VIA ALLIANCE SEMICONDUCTOR CO., LTD., Shanghai (CN)

(72) Inventors: Thomas Elmer, Austin, TX (US); Nikhil A. Patil, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 162 days.

(21) Appl. No.: 15/202,351

(22) Filed: Jul. 5, 2016

(65) Prior Publication Data
US 2017/0097824 A1    Apr. 6, 2017

Related U.S. Application Data
(60) Provisional application No. 62/236,529, filed on Oct. 2, 2015.

(51) Int. Cl.
*G06F 9/38* (2018.01)
*G06F 7/544* (2006.01)
(Continued)

(52) U.S. Cl.
CPC ........ *G06F 9/3001* (2013.01); *G06F 9/30014* (2013.01); *G06F 9/3836* (2013.01); *G06F 9/3893* (2013.01)

(58) Field of Classification Search
CPC .... G06F 9/3001; G06F 9/3893; G06F 9/3836; G06F 9/30014; G07F 7/483; G07F 7/5443
(Continued)

(56) References Cited

U.S. PATENT DOCUMENTS 4,187,539 A    2/1980 Eaton
4,974,198 A    11/1990 Ishii
(Continued)

FOREIGN PATENT DOCUMENTS

CN    1327555 A    12/2001
EP    0681236       11/1995
(Continued)

OTHER PUBLICATIONS

Hokenek, Erdem et al. "Second-Generation RISC Floating Point with Multiply-Add Fused" IEEE Journal of Solid-State Circuits, vol. 25, No. 5, Oct. 1990; pp. 1207-1213.
(Continued)

*Primary Examiner* — Aimee Li
*Assistant Examiner* — Shawn Doman
(74) *Attorney, Agent, or Firm* — McClure, Qualey & Rodack, LLP

(57) ABSTRACT

A microprocessor is configured for unchained and chained modes of split execution of a fused compound arithmetic operation. In both modes of split execution, a first execution unit executes only a first part of the fused compound arithmetic operation and produces an intermediate result thereof, and a second instruction execution unit receives the intermediate result and executes a second part of the fused compound arithmetic operation to produce a final result. In the unchained mode, execution is accomplished by dispatching separate split-execution microinstructions to the first and second instruction execution units. In the chained mode, execution is accomplished by dispatching a single split-execution microinstruction to the first instruction execution unit and sending a chaining control signal or signal group to the second execution unit, causing it to execute its part of the fused arithmetic operation without needing an instruction.

5 Claims, 6 Drawing Sheets

(51) Int. Cl.
*G06F 7/575* (2006.01)
*G06F 9/22* (2006.01)
*G06F 9/28* (2006.01)
*G06F 9/30* (2018.01)

(58) Field of Classification Search
USPC .......................................... 712/221; 708/501
See application file for complete search history.

(56) References Cited

U.S. PATENT DOCUMENTS

| | | | |
|---|---|---|---|
| 5,204,828 A * | 4/1993 | Kohn | G06F 7/483 |
| | | | 708/501 |
| 5,347,481 A | 9/1994 | Williams | |
| 5,375,078 A | 12/1994 | Hrusecky et al. | |
| 5,880,983 A | 3/1999 | Elliott et al. | |
| 5,880,984 A | 3/1999 | Burchfiel et al. | |
| 5,990,351 A | 11/1999 | Cabre et al. | |
| 6,094,668 A | 7/2000 | Oberman | |
| 6,233,672 B1 | 5/2001 | Lynch | |
| 6,427,159 B1 | 7/2002 | Giaume | |
| 6,779,013 B2 | 8/2004 | Pangal | |
| 6,947,962 B2 | 9/2005 | Hoskote et al. | |
| 7,080,111 B2 | 7/2006 | Pangal et al. | |
| 7,117,372 B1 | 10/2006 | Trimberger et al. | |
| 7,401,107 B2 | 7/2008 | Lutz et al. | |
| 7,451,172 B2 * | 11/2008 | Powell, Jr. | G06F 7/483 |
| | | | 708/501 |
| 7,689,641 B2 | 3/2010 | Abel et al. | |
| 7,720,900 B2 * | 5/2010 | Gerwig | G06F 7/483 |
| | | | 708/501 |
| 7,917,568 B2 | 3/2011 | Henry et al. | |
| 8,046,399 B1 | 10/2011 | Inaganti et al. | |
| 8,386,755 B2 | 2/2013 | Elmer et al. | |
| 8,443,030 B1 * | 5/2013 | Tang | G06F 9/3893 |
| | | | 708/495 |
| 8,577,948 B2 | 11/2013 | Srinivasan et al. | |
| 8,671,129 B2 | 3/2014 | Brooks et al. | |
| 2004/0098439 A1 | 5/2004 | Bass et al. | |
| 2004/0267857 A1 | 12/2004 | Abel et al. | |
| 2005/0125476 A1 | 6/2005 | Symes et al. | |
| 2006/0136543 A1 | 6/2006 | Lutz et al. | |
| 2006/0184601 A1 | 8/2006 | Trong et al. | |
| 2007/0038693 A1 | 2/2007 | Jacobi et al. | |
| 2007/0266071 A1 | 11/2007 | Dockser et al. | |
| 2008/0016321 A1 | 1/2008 | Pennock et al. | |
| 2008/0141253 A1 * | 6/2008 | Luick | G06F 9/3001 |
| | | | 718/102 |
| 2008/0215659 A1 | 9/2008 | Cowlishaw et al. | |
| 2008/0256150 A1 | 10/2008 | Quinnell et al. | |
| 2008/0256161 A1 | 10/2008 | Quinnell et al. | |
| 2008/0256162 A1 * | 10/2008 | Henry | G06F 7/483 |
| | | | 708/523 |
| 2009/0248769 A1 | 10/2009 | Chua | |
| 2010/0268920 A1 | 10/2010 | Brooks et al. | |
| 2011/0029760 A1 | 2/2011 | Elmer et al. | |
| 2011/0072066 A1 | 3/2011 | Lutz et al. | |
| 2012/0072703 A1 | 3/2012 | Srinivasan et al. | |
| 2012/0215823 A1 | 8/2012 | Lutz | |
| 2014/0006467 A1 | 1/2014 | Samudrala et al. | |
| 2014/0122555 A1 * | 5/2014 | Hickmann | G06F 7/48 |
| | | | 708/523 |
| 2014/0188966 A1 | 7/2014 | Galal et al. | |
| 2014/0189305 A1 * | 7/2014 | Hickmann | G06F 11/14 |
| | | | 712/205 |
| 2016/0004504 A1 | 1/2016 | Elmer | |
| 2016/0004505 A1 | 1/2016 | Elmer | |
| 2016/0004506 A1 | 1/2016 | Elmer | |
| 2016/0004507 A1 | 1/2016 | Elmer | |
| 2016/0004508 A1 | 1/2016 | Elmer | |
| 2016/0004509 A1 | 1/2016 | Elmer | |
| 2016/0004665 A1 | 1/2016 | Elmer | |

FOREIGN PATENT DOCUMENTS

| | | |
|---|---|---|
| JP | H10207693 A | 8/1998 |
| WO | WO2007094047 | 8/2007 |
| WO | WO2012040632 | 3/2012 |

OTHER PUBLICATIONS

Lang, Tomas et al. "Floating-Point Multiply-Add-Fused with Reduced Latency" IEEE Transactions on Computers, vol. 53, No. 8, Aug. 2004; pp. 988-1003.

Bruguera, Javier D. et al. "Floating-Point Fused Multiply-Add: Reduced Lateny for Floating-Point Addition" Computer Arithmetic, 2005; pp. 42-51.

Vangal, Sriram R. et al. "A 6.2-GFlops Floating-Point Multiply-Accumulator With Conditional Normalization" IEEE Journal of Solid-State Circuits, vol. 41, No. 10, Oct. 2006. pp. 2314-2323.

Galal, Sameh et al. "Energy Efficient Floating-Point Unit Design", IEEE Transactions on Computers, vol. 60, No. 7, Jul. 2011; pp. 913-922.

Srinivasan, Suresh et al. "Split-path Fused Floating Point Multiply Accumulate (FPMAC)", 2013 IEEE 21st Symposium on Computer Arithmetic; pp. 17-24.

Srinivasan, Suresh et al. "Split-path Fused Floating Point Multiply Accumulate (FPMAC)" 2014 Symposium on Computer Arithmetic. Austin TX, (slides from www.arithsymposium.org) pp. 1-19.

Quach, Nhon et al. "Suggestions for Implementing A Fast IEEE Multiply-Add-Fused Instruction" (Stanford) Technical Report CSL-TR-91-483 Jul. 1991; pp. 1-17.

Seidel, Peter-Michael. "Multiple Path IEEE Floating-Point Fused Multiply-Add", IEEE 2004; pp. 1359-1362.

Huang, Libo et al. "A New Architecture for Multiple-Precision Floating-Point Multiply-Add Fused Unit Design" 18th IEEE Symposium on Computer Arithmetic. 2007 IEEE pp. 1-8.

Paidimarri, Arun et al. "FPGA Implementation of a Single-Precision Floating-Point Multiply-Accumulator with Single-Cycle Accumulation" 2009 17th IEEE Symposium on Field Programmable Custom Computing Machines. 2009 IEEE. pp. 267-270.

Walla, Abd El Aziz Ibrahim. "Binary Floating Point Fused Multiply Add Unit" Thesis Submitted to Cairo University, Giza, Egypt, 2012 (retr from Google). pp. 1-100.

Quinnell, Eric Charles. "Floating-Point Fused Multiply-Add Architectures" Dissertation Presented to Univ Texas at Austin, May 2007. pp. 1-150.

Author Unknown. "AMD Athlon™ Processor Floating Point Capability", AMD White Paper Aug. 28, 2000.

Cornea, Marius et al. "Intel® Itanium® Floating-Point Architecture" ACM, Jun. 6, 2003. pp. 1-9.

Gerwig, G. et al. "The IBM eServer z990 Floating-Point Unit", IBM Journal Res & Dev. vol. 48, No. 3/4. May, Jul. 2004. pp. 311-322.

Wait, C.D., "IBM PowerPC 440 FPU with complex-arithmetic extensions" IBM Journal Res & Dev. vol. 49, No. 2/3. Mar., May 2005. pp. 249-254.

Chatterjee, S. et al. "Design and exploitation of a high-performance SIMD floating-point unit for Blue Gene/L" IBM Journal Res & Dev. vol. 49, No. 2/3. Mar., May 2005. pp. 377-391.

Seidel, Peter-Michael. "Multiple Path IEEE Floating-Point Fused Multiply-Add." Proc 46th Int. IEEE MWSCAS, 2003 pp. 1-4.

Wikipedia "CPU Cache" Downloaded from http://en.wikipedia.org/wiki/Cache_memory on Jan. 11, 2017. pp. 1-11.

Knowles, Simon. "Arithmetic Processor Design for the T9000 Transputer" SPIE vol. 1566 Advanced Signal Processing Algorithms, Architectures, and Implementations II. 1991 pp. 230-243.

Schmookler, M. et al. "Leading Zero Anticipation and Detection—A Comparison of Methods" IEEE Xplore. Downloaded Apr. 21, 2009 pp. 7-12.

Schwarz, E et al. "FPU Implementations with Denormalized Numbers" IEEE Transactions on Computers, vol. 54, No. 7, Jul. 2005. pp. 825-836.

Schwarz, E. et al. "Hardware Implementations of Denormalized Numbers" Proceeding of the 16th IEEE Symposium on Compyter Arithmetic. 2003 IEEE pp. 1-9.

(56) References Cited

OTHER PUBLICATIONS

Trong, S. et al. "P6 Binary Floating-Point Unit" IEEE Xplore Conference Paper. Jul. 2007. pp. 1-10.

* cited by examiner

CHAINED SPLIT EXECUTION OF FUSED COMPOUND ARITHMETIC OPERATIONS

RELATED APPLICATIONS

This application claims the benefit of U.S. Provisional Patent Application No. 62/236,529, filed Oct. 2, 2015, which is herein incorporated by reference.

This application is related to U.S. patent application Ser. No. 14/748,817 ("the '817 application"), filed Jun. 24, 2015 and entitled "Non-atomic Split-Path Fused Multiply-Accumulate," which claims the benefit of U.S. Provisional Patent Application No. 62/020,246, filed Jul. 2, 2014, entitled "Non-Atomic Split-Path Fused Multiply-Accumulate with Rounding cache," and U.S. Provisional Patent Application No. 62/173,808, filed Jun. 10, 2015, entitled "Non-Atomic Temporally-Split Fused Multiply-Accumulate Apparatus and Operation Using a Calculation Control Indicator Cache and Providing a Split-Path Heuristic for Performing a Fused FMA Operation and Generating a Standard Format Intermediate Result," all of the above of which are herein incorporated by reference.

This application is also related to and incorporates by reference the following applications filed on Jun. 24, 2015: application Ser. No. 14/748,870, entitled "Temporally Split Fused Multiply-Accumulate Operation," application Ser. No. 14/748,924, entitled "Calculation Control Indicator Cache," application Ser. No. 14/748,956, entitled "Calculation Control Indicator Cache," application Ser. No. 14/749,002, entitled "Standard Format Intermediate Result," application Ser. No. 14/749,050, entitled "Split-Path Heuristic for Performing a Fused FMA Operation," and application Ser. No. 14/749,088, entitled "Subdivision of a fused compound arithmetic operation."

FIELD OF THE INVENTION

This application relates to microprocessor designs for performing arithmetic operations, and more particularly, fused FMA operations.

BACKGROUND

The '817 application describes a microprocessor comprising pairs of instruction execution units (for example, multipliers and adders) configured to perform first and second sub-operations of a fused compound arithmetic operation, and more specifically for a fused floating-point multiply-accumulate operation. It also describes a multiplier that conditionally accumulates C to the partial products of A and B, generating an unrounded, intermediate result, which is then stored and/or forwarded to an adder that completes the calculation, producing a final, rounded result. To perform an FMA operation, the microprocessor issues two microinstructions, an FMA1 microinstruction to the multiplier and an FMA2 microinstruction to the adder.

A characteristic of a fused compound arithmetic operation is that rounding (if any) is delayed until a compound arithmetic operation is complete. For example, in a fused floating-point multiply-accumulate (FMA) operation of A*B+C, C is accumulated to the product of A and B before the product of A and B is rounded. While the FMA operation is perhaps the most-well known of fused floating-point operations, a "fused" operation is not limited to floating-point multiply-accumulate operations. In a more general sense, a fused arithmetic operation is one in which a conjoined calculation has traditionally been performed atomically in the logic circuitry of a single CPU instruction execution unit.

In the less precise, "unfused" FMA operation of A*B+C, the intermediate results of the first sub-operation (A*B) are rounded and then the rounded values used in the second sub-operation (C+the rounded sum of (A*B)) to produce a final result, which is also rounded. This can result in double rounding errors, wherein the result is not as precise as the result that would be obtained with a fused compound arithmetic operation. A simple example would be the problem $2.9 \times 10^{-1} * 2.6 \times 10^{-1} - 7.5 \times 10^{-2}$, in which rounding is done to two significant digits. An unfused operation would round the product, 0.0754, to two significant digits, i.e., 0.075, before subtracting 0.075, producing a final result of 0. A fused operation, by contrast, would produce the equivalent of not rounding the product prior to the accumulation, producing a result of $0.0754 - 0.075 = 0.004$.

The '817 application's use of distinct execution units to perform a fused FMA operation produces many advantages, among them, an arrangement that performs FMA calculations using two relatively compact execution units (a multiplier and an adder) instead of a larger atomic FMA execution unit, and in a manner that allows the adder to execute an unrelated microinstruction while the multiplier performs the first sub-operation, and which likewise allows the multiplier to execute an unrelated microinstruction while the adder performs the second sub-operation.

The foregoing arrangement, however, suffers a performance disadvantage when the pipeline is saturated with FMA instructions, if a plurality of split-FMA-capable adders and multipliers share the same dispatch port. This is because the scheduler can dispatch only one microinstruction through a dispatch port at a time. The number of FMA operations that could be completed by four dispatch ports each connected to a multiplier and an adder, for example, would only be half that could be completed were each dispatch port connected, instead, to a single atomic FMA unit.

It will be understood that given the fact that the '817 application had not yet been published before the priority date of this application, nothing in the foregoing should be construed as suggesting that the invention of that application is prior art to this application.

SUMMARY

The invention may be characterized as a microprocessor comprising first and second execution units. Like conventional execution units, each instruction execution unit comprises a set of logic circuitry provided to execute any of a designated set of microinstructions sent to it for completion, and to produce final results thereof. But unlike conventional execution units, the first and second instruction execution units are also configured for split execution of a designated set of fused compound arithmetic operations. The first instruction execution unit, after receiving a split-execution microinstruction, executes only a first part of the fused compound arithmetic operation and produces an intermediate result thereof. The second instruction execution unit receives the intermediate result and executes a second part of the fused compound arithmetic operation to produce a final result. Additionally, the second instruction execution unit is configured to execute the second part of the fused compound arithmetic operation without receiving a microinstruction that is distinct from the split-execution microinstruction received by the first instruction execution unit.

The invention can be further characterized by a number of implementations, features, and aspects, and various combinations of the same. In one implementation, the second instruction execution unit is configured to execute the second part of the fused compound arithmetic operation without receiving the split-execution microinstruction. A control signal path couples the first instruction execution unit to the second instruction execution unit, the control signal path is configured to deliver a signal to the second instruction execution unit to execute the second part of the fused compound arithmetic operation.

In an alternative implementation, logic within the second instruction execution unit detects the dispatched split-execution microinstruction and prepares the second execution unit to receive, at the appropriate clock cycle, the intermediate result outputted by the first instruction execution unit and begin executing the second part of the fused compound arithmetic operation.

In both implementations, a forwarding path links the first instruction execution unit to the second instruction execution unit, enabling the first instruction execution unit to directly forward the intermediate result to the second instruction execution unit.

Also in one implementation, the second instruction execution unit is statically linked to the first instruction execution unit. This means that only the second instruction execution unit is operable to complete the split-execution microinstruction partially performed by the first execution instruction unit.

But in an alternative implementation, the second instruction execution unit is dynamically linked to the first instruction execution unit. This means that the second instruction execution unit is one of a plurality of instruction execution units operable to complete the split-execution microinstruction partially performed by the first execution instruction unit. In one sub-implementation, a scheduler determines which instruction execution unit to pair with the first instruction execution unit for completion of the split-execution microinstruction. In an alternative sub-implementation, the first instruction execution unit dynamically identifies an available second instruction execution unit to complete the split-execution microinstruction, and if none is available, bumps a conflicting microinstruction executing in a second instruction execution unit, causing the scheduler to reschedule the conflicting microinstruction.

In one implementation, the designated set of fused compound arithmetic operations consists of one or more floating-point multiply-add microinstructions, and the first instruction execution unit is a multiplier and the second instruction execution unit is an adder.

According to one characterization of the invention, a fused compound arithmetic operation is one in which no rounding is performed to generate the intermediate result. According to another characterization of the invention, a fused compound arithmetic operation is one in which effectively no precision is lost in the final result by any intermediate result that may take place.

In one particular implementation, the fused compound arithmetic operation is a fused multiply-accumulate operation of a form $\pm A*B\pm C$, wherein A, B, and C are input operands. Moreover, the first instruction execution unit is a multiplier and the second instruction execution unit is an adder. In one aspect of this implementation, the multiplier is configured to execute a first part of the fused multiply-accumulate operation, including a calculation that multiplies A and B and conditionally accumulates C to partial products of A and B. In another aspect, the adder is configured to accumulate C to the products of A and B when the multiplier does not accumulate C to the partial products of A and B, and in either case to round the result of the calculation.

In another aspect, the microprocessor also comprises a scheduler configured to dispatch the split-execution microinstruction to a single selected port for serial execution by a plurality of execution units, a first of which is coupled to the selected port. The scheduler is configured to dispatch the split-execution microinstruction only once to perform the entire serial execution, without re-dispatching the split-execution microinstruction to each of the execution units participating in the serial execution of the split-execution microinstruction. The scheduler is also configured to reserve an adder to service a forwarding path that receives the result of the multiplier performing the first part of the FMA operation. The scheduler is configured to reserve a second instruction execution unit to execute the second part of the fused compound arithmetic operation, by abstaining, at a time the second instruction execution unit is to receive the intermediate result from the first instruction execution unit, from dispatching a microinstruction through said dispatch port that would compete for resources needed by the second instruction execution unit to execute the second part of the fused compound arithmetic operation.

The invention can also be characterized as a method of executing a fused compound arithmetic operation. The method comprises dispatching to a first instruction execution unit a split-execution microinstruction specifying the fused compound arithmetic operation. The first instruction execution unit executes only a first part of the fused compound arithmetic operation and produces an intermediate result thereof. A second instruction execution unit receives the intermediate result and executes a second part of the fused compound arithmetic operation to produce a final result. Each instruction execution unit comprises a set of logic circuitry provided to execute any of a designated set of microinstructions, other than the split-execution microinstruction, sent to it for completion, and to produce final results thereof. The second instruction execution unit executes the second part of the fused compound arithmetic operation without receiving a microinstruction that is distinct from the split-execution microinstruction received by the first instruction execution unit.

The invention can be further characterized by a number of implementations, features, and aspects, and various combinations of the same. For example, the method in one implementation further comprises delivering a control signal other than an opcode to the second instruction execution unit to execute the second part of the fused compound arithmetic operation, and/or forwarding the intermediate result to the second instruction execution unit.

Also in one implementation, the fused compound arithmetic operation is a floating-point multiply-add microinstruction, and the first instruction execution unit is a multiplier and the second instruction execution unit is an adder. In a more particular implementation, the fused compound arithmetic operation is a fused multiply-accumulate operation of a form $\pm A*B\pm C$, wherein A, B, and C are input operands; the first instruction execution unit is a multiplier and the second instruction execution unit is an adder. Even more particularly, the multiplier executes a first part of the fused multiply-accumulate operation, which includes multiplying A and B and conditionally accumulating C to partial products of A and B; the adder accumulates C to the products of A and B when the multiplier does not accumulate C to the partial products of A and B; and the adder rounds the result of the calculation.

In another implementation, the method further comprises dispatching the given microinstruction to a single selected port for serial execution by a plurality of execution units, a first of which is coupled to the selected port, without re-dispatching the split-execution microinstruction to each of the execution units participating in the serial execution of the split-execution microinstruction. In another aspect, the method also comprises scheduling or reserving an adder to be available to service a forwarding path that receives the intermediate result of the multiplier performing the first part of the FMA operation. This may be done by abstaining, at a time the second instruction execution unit is to receive the intermediate result from the first instruction execution unit, from dispatching a microinstruction through a dispatch port that would compete for resources needed by the second instruction execution unit to execute the second part of the fused compound arithmetic operation.

The invention may also be characterized as a microprocessor comprising first and second instruction execution units that are configured to perform both chained and non-chained modes of split execution of a designated set of fused compound arithmetic operations. In the non-chained mode of split execution, first and second non-chained split-execution microinstructions are issued to the first and second instruction execution units, respectively. In the chained mode of split execution, a single chained split-execution microinstruction is issued that causes both the first and second instruction execution units to execute their respective parts of the compound arithmetic operation.

In one implementation, a configurable signal source is provided to store a configuration setting to specify the mode of split execution, and the microprocessor is configured to issue either the first and second non-chained split-execution microinstructions, or the single chained split-execution microinstruction, in accordance with the configuration setting, in response to an instruction specifying the compound arithmetic operation. The configuration setting may be configured to be set by supervisory software.

In another implementation, an instruction translator may be configured to translate an instruction specifying the compound arithmetic operation in accordance with the configuration setting into either the first and second non-chained split-execution microinstructions for performing the non-chained mode of split execution, or into a single chained split-execution microinstruction for performing the chained mode of split execution.

It will be appreciated that the invention can be characterized in multiple ways, including but not limited to the characterizations above or to any implementations, aspects, features or characteristics described in this specification.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
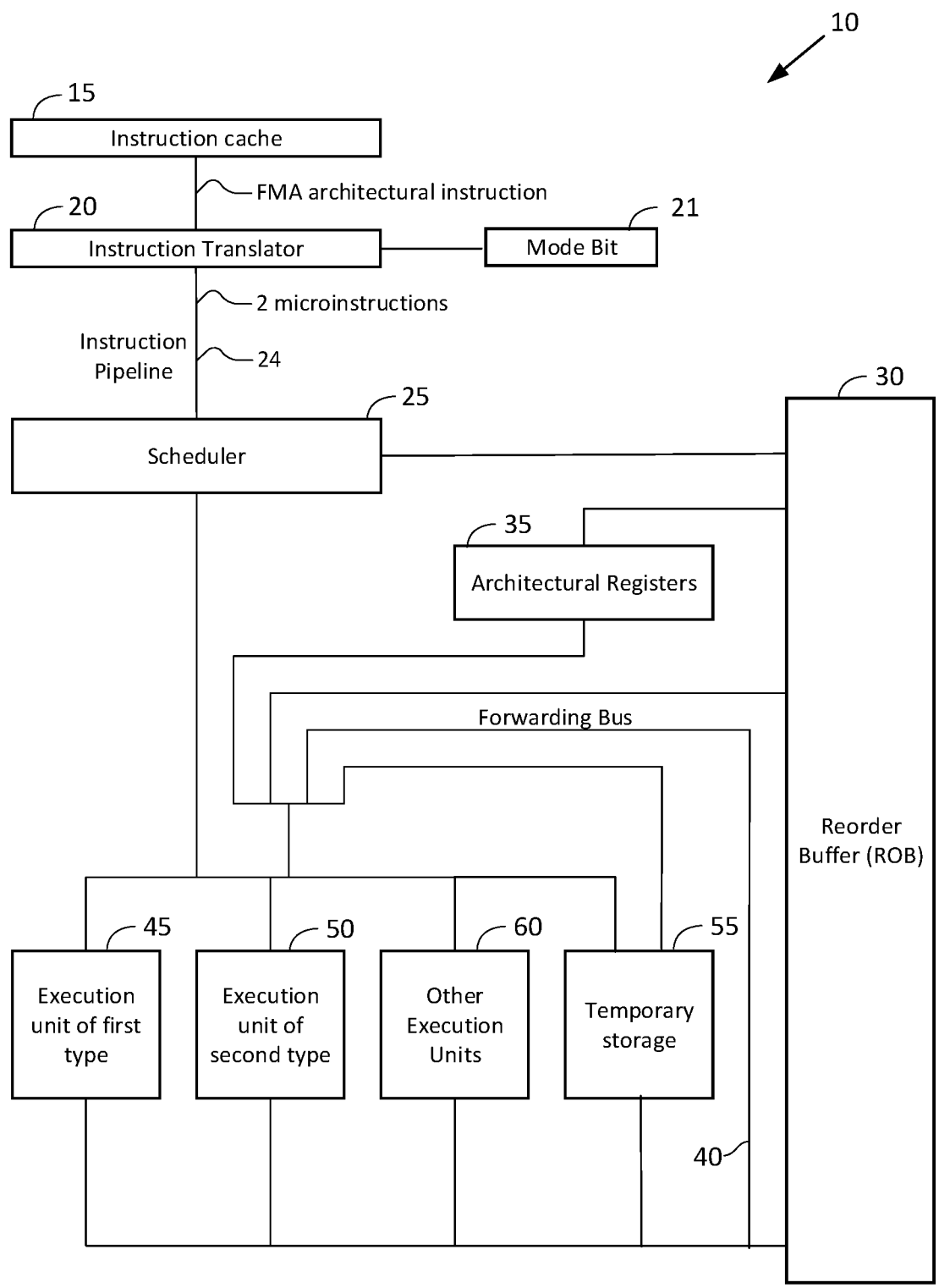
FIG. 1 is a top-level diagram of one embodiment of a microprocessor configured for split execution of a fused compound arithmetic operation.

FIGS. 1-8 illustrate various aspects of various embodiments of the present invention. FIG. 1 is adapted from FIG. 1 of the '817 application, and uses consistent reference numbers. Because the '817 application uses reference numbers that range to the 500 s, FIGS. 2-8 of this application picks up where the '817 application left off, using reference numbers beginning in the 600 range. This facilitates discussion of the present application in the context of the '817 application.

Referring now to FIG. 1, a block diagram illustrating a microprocessor 10 is shown. The microprocessor 10 has a plurality of execution units 45, 50, 60 configured to execute FMA calculations. The microprocessor 10 includes an instruction cache 15, an instruction translator 20, a scheduler 25, a plurality of execution units 45, 50, and 60, temporary storage 55 (alternatively referred to as calculation control indicator storage), architectural registers 35, and a reorder buffer 30. Other functional units (not shown) may include a microcode unit; branch predictors; a memory subsystem including a cache memory hierarchy (e.g., level-1 data cache, level 2 cache), memory order buffer, and memory management unit; data prefetch units; and a bus interface unit, among others.

The microprocessor 10 has an out-of-order execution microarchitecture in that instructions may be issued for execution out of program order. More specifically, microinstructions, into which architectural instructions (or macroinstructions) are translated or transformed, may be issued for execution out of program order. The program order of the microinstructions is the same as the program order of the respective architectural instructions from which they were translated or transformed. The microprocessor 10 also has a superscalar microarchitecture in that it is capable of issuing multiple instructions per clock cycle to the execution units for execution. In one implementation, the microprocessor 10 provides for execution of instructions in a manner compatible with the x86 instruction set architecture.

The instruction cache 15 caches architectural instructions fetched from system memory. The instruction translator 20 translates or transforms the architectural instructions fetched from the instruction cache 15 into microinstructions of a microinstruction set of the microarchitecture of the microprocessor 10. The execution units 45, 50, 60 execute the microinstructions. The microinstructions into which an architectural instruction is translated or transformed implement the architectural instruction. The scheduler 25 receives and allocates entries in the ROB 30 for microinstructions in program order, reserves for the microinstruction a dispatch port associated with the execution unit that will execute the microinstruction, updates the microinstruction with the index of the allocated ROB entry, dispatches the microinstruction through the reserved dispatch port, and performs register renaming and dependency generation for the microinstructions.

Each instruction execution unit 45, 50, 60 is a separate, atomic, stand-alone arithmetic processing unit in an instruction pipeline 24 that decodes machine level instructions (e.g., a designated set of instructions in a CISC microarchitecture or a designated set of microinstructions in a RISC microarchitecture), operates on machine level instructions independently, reads its operands from and writes its results to a collection of shared high-speed memory, and provides control signals to internal data paths. The shared high-speed memory may be a register file or a set of non-architected computational registers (e.g., the reorder buffer 30) that are provided for microinstructions to exchange data and make their results visible to other execution units. Stated another way, each instruction execution unit 45, 50, 60 comprises a characteristic set of logic circuitry provided to execute a designated set of machine level instructions intentionally delivered to it for completion, and to produce final results thereof. An instruction execution unit contrasts with a larger cluster of circuitry (if present) operable to execute multiple machine instructions in a parallel (and not merely pipelined) fashion.

The microprocessor's execution units include both conventional instruction execution units 60 and specialized instruction execution units 45 and 50 of at least first and second types. The specialized instruction execution units 45 and 50 are configured not only for producing final results for a designated set of conventional microinstructions, but also for split execution of a designated set of fused compound arithmetic operations. After the specialized instruction execution unit 45 of the first type receives a split-execution microinstruction specifying a first part of a fused compound arithmetic operation, the unit 45 executes the first part of the fused compound arithmetic operation and produces an intermediate result thereof. The intermediate result is either stored in temporary storage 55, forwarded along forwarding bus 40 to a second instruction execution unit 50, or both. The second instruction execution unit 50 receives the intermediate result and executes a second part of the fused compound arithmetic operation to produce a final result which may ultimately be stored in one of the architectural registers 35.

"Fused" refers to the requirement that any intermediate results are processed and presented in a manner that ensures that the fused compound arithmetic operation produces an arithmetically correct result representation that is indistinguishable from the result that would be generated from an infinitely precise calculation of the compound arithmetic operation reduced in representation to the target data size.

For example, an unfused multiply-add operation of the form A*B+C would compute the product A*B, round it to N significant bits, add the result to C, and round back to N significant bits. A fused multiply-add, by contrast, would compute the entire sum A*B+C to its full precision before rounding the final result down to N significant bits.

Performing a multiply-add operation that contemplates rounding across two or more instruction execution units 45, 50 requires preservation of information that would otherwise be lost if nothing more than rounded intermediate results were transferred between the instruction execution units 45, 50. In one implementation, this is accomplished by providing an intermediate result bus with an extended width sufficient to transfer fully precise intermediate results between the instruction execution units 45, 50. In another implementation, this is accomplished by transferring the intermediate result with less than full precision together with a plurality of rounding and/or calculation control indicators that will enable an identical result to be obtained, as described in the '817 application. Other implementations are also possible.

The ability of the specialized instruction execution units 45 and 50 to produce or receive intermediate results that have sufficient information to split the execution of a fused compound arithmetic operation and still consistently produce an equally precise arithmetically correct result is a notable aspect distinguishing the "specialized" instruction execution units 45 and 50 from "conventional" instruction execution units 60. Using a conventional multiplier and a conventional adder to perform a compound arithmetic operation, by contrast, would produce a doubly-rounded result that would not, for all possible calculations, produce results that were identical to those produced by a fused version of that operation.

The specialized execution units 45 and 50 are also distinguished, in their preferred implementations, by their ability to execute both (a) any of a designated first set of one or more microinstructions sent to it for completion and produce final results therefore and (b) any of a designated second set of one or more split-execution microinstructions to either produce (as an output) or receive (as an input) intermediate results.

For example, in one implementation, the specialized instruction units 45 and 50 are a multiplier and adder, similar to those described in the '817 application. More particularly, the modified multiplier 45 is a suitable multiply computation unit that may be, in most aspects, conventional in that it can execute ordinary multiply microinstructions that are not part of FMA operations. Likewise, the modified adder 50 is a suitable adder computation unit that may be, in most aspects, conventional in that it can execute ordinary accumulation microinstructions that are not FMA operations, such as add or subtract. However, both the modified multiplier 45 and modified adder 50 have specialized modifications that configure them for split execution of a fused floating-point multiply-accumulate (FMA) operation representable by the formula $\pm A*B\pm C$.

In particular, the modified multiplier 45 is capable of performing a first stage or portion of a fused FMA operation (FMA1 sub-operation), generating and outputting a normalized summation result 145 and a plurality of calculation control indicators. In one implementation, the modified multiplier 45 computes and sums the partial products of A and B, and conditionally includes C in that summation, producing an intermediate result and a plurality of calculation control indicators. On the other hand, when performing a non-FMA operation, the modified multiplier 45 generates a rounded, IEEE-compliant result.

The modified adder 50 is capable of performing a second stage or portion of a fused FMA operation (FMA2 sub-operation). In one implementation, the modified adder 50 completes the FMA operation by conditionally adding C to the intermediate result if C was not included in the multiplier 45's summation, and then producing a final result that takes into account both the calculation control indicators received via signal path 749 from the modified multiplier 45 and additional calculation control indicators generated during the adder's performance of the second part of the FMA operation.

In addition to rounding indicators, the calculation control indicators indicate the nature of the calculation, such as whether the calculation is a multiply-add, a multiply-subtract, the precision (e.g., single, double or extended), the rounding mode, and any other information that the modified adder would normally extract from a second microinstruction.

As discussed in the '817 application, whether the modified multiplier 45 or the modified adder 50 accumulates C depends in part on the width of the partial product summation tree and where C would fit into that tree to accumulate C with the partial products of A and B. This in turn depends on the relative magnitudes of exponents of A, B and C. The unit selected to accumulate C also depends on whether the accumulation of C to the products of A and B would result in an effective subtraction.

Because the temporary storage 55 is part of a shared memory visible to other execution units, the modified adder 50, which is physically and/or logically separate from the modified adder 45, can receive an intermediate result via an intermediate result data path and perform the FMA2 sub-operation. Moreover, other unrelated operations can be performed between the FMA1 and FMA2 sub-operations.

A third significant aspect distinguishes the specialized execution units 45 and 50 from conventional execution units. This third aspect also distinguishes the specialized execution units 45 and 50 from those described in the '817 application. This third aspect is the ability, in a "chained" mode of execution, of specialized execution units 45 and 50 to perform respective first and second parts of a fused compound arithmetic operation in response to the execution units 45 and 50 collectively receiving only a single split-execution microinstruction. The chained mode of execution is contradistinguished from an "unchained" mode of execution in which both specialized execution units 45 and 50 require respective specialized microinstructions (e.g., the FMA1 and FMA2 microinstructions described in the '817 application).

Related to the chained mode of execution is the configurable signal source 21 of FIG. 1. The configurable signal source 21 of FIG. 1 is a memory element storing one or more bits, an external input pin to the physical die, or a fuse programmed at manufacturing that is read by the instruction translator 20. For convenience but not for purposes of limitation, this signal source 21 is designated as a "mode bit" in FIG. 1. The configurable signal source 21 determines a mode of execution—e.g., chained or unchained—of a fused compound arithmetic operation. Before explaining the relative advantages of chained and unchained modes of execution, it is instructive to describe certain aspects of the instruction scheduler 25 and limitations that are created when there are not enough dispatch ports to serve all of the execution units available to execute a high throughput of fused compound arithmetic operations.

Figure 2:
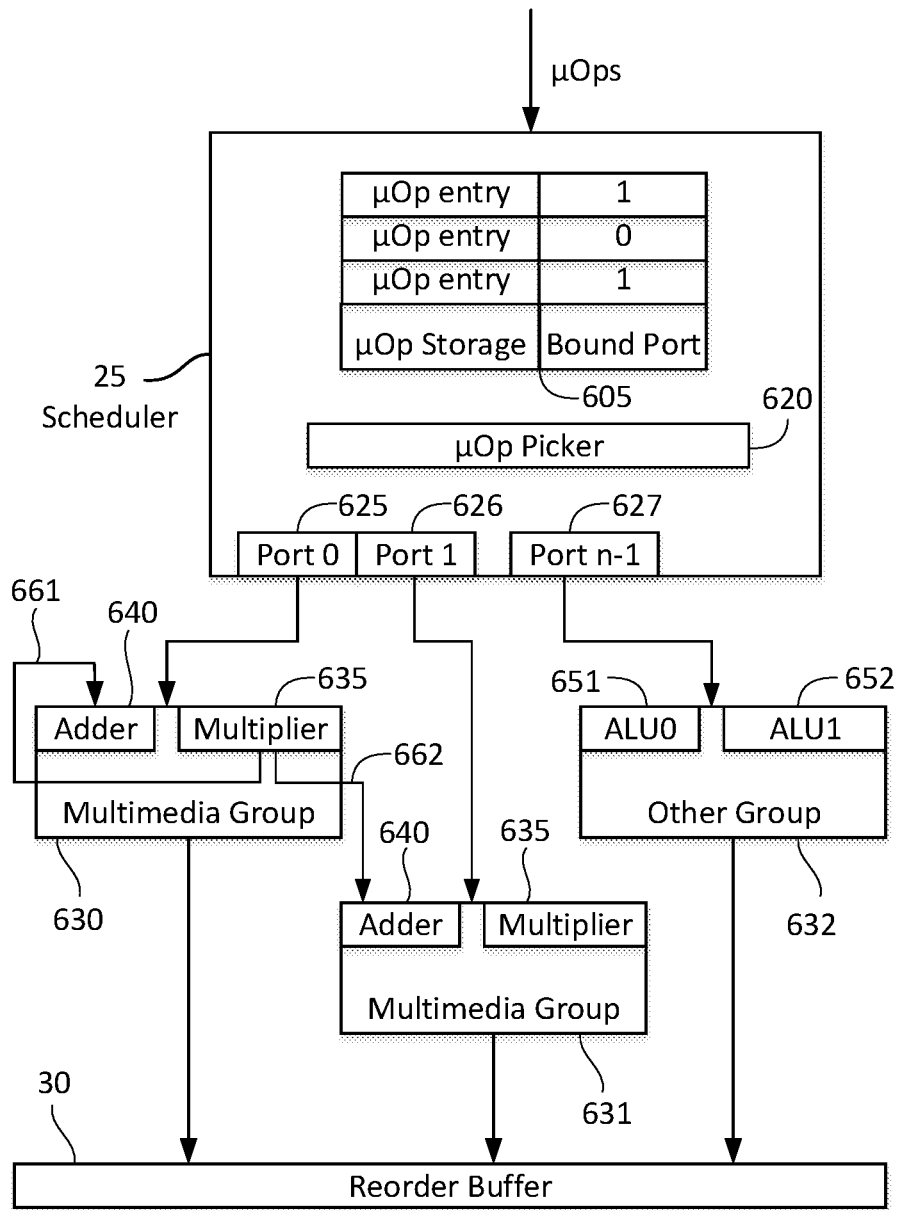
FIG. 2 illustrates one embodiment of an execution pipeline of the microprocessor of FIG. 1.

FIG. 2 is a block diagram of one embodiment of a portion of the execution pipeline of the microprocessor 10 of FIG. 1, including a microinstruction scheduler 25, a reorder buffer 30, and a plurality of execution units 45, 50 and 60. The scheduler 25 is coupled to the instruction translator 20, from which it receives and stores microinstructions in a microinstruction entry of a storage table 605. The scheduler 25 provides a plurality of microinstruction dispatch ports 0 . . . n−1 designated by reference numbers 625, 626 and 627, each of which is coupled to a corresponding port-sharing group 630, 631, and 632 of execution units.

In one implementation, the microprocessor 10 includes a plurality of port-sharing multimedia groups 630 and 631 of execution units, each of which comprises an adder 635 and a multiplier 640. The microprocessor 10 also includes other port-sharing groups 632 of execution units comprising their own sets of arithmetic logic units 651 and 652, memory operation units, and other types of execution units (not shown). The microprocessor 10 may also include some execution units that have their own dedicated ports (i.e., ports that are not shared with any other execution unit). The final results produced by the execution units are temporarily stored in the reorder buffer 30 before being conditionally committed to appropriate architectural registers 35.

The scheduler 25 includes a microinstruction picker 620 that determines which execution resource(s) to allocate to each microinstruction (i.e., to which port 625, 626, 627 to bind the microinstruction) and the clock cycle during which the microinstruction will be dispatched to an execution resource. As explained further below, the microinstruction picker 620 also plays a part in enabling different modes of split execution of a fused compound arithmetic operation.

Figure 3:
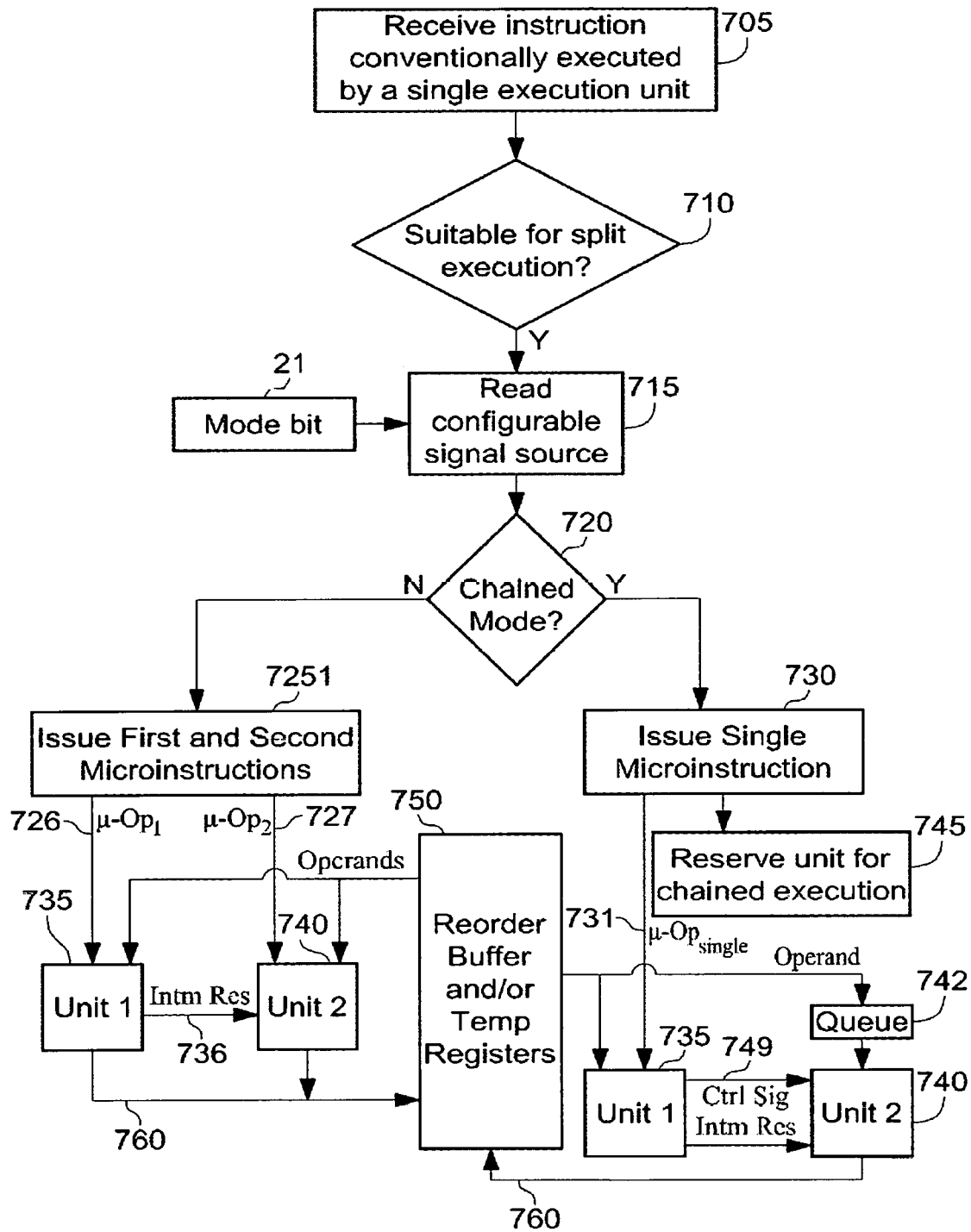
FIG. 3 is a block diagram illustrating functional and structural features of a microprocessor configured for two modes of split execution of a fused compound arithmetic operation.

The selection between "chained" and "unchained" modes of execution, and the rationales for making such selections, are now explained in connection with FIG. 3. FIG. 3 is a part functional flow, part structural block diagram of one embodiment of a microprocessor 10 configured for two modes—chained and unchained—of non-atomic execution of a fused compound arithmetic operation. In flow block 705, the instruction translator 20 receives an instruction (for example, an FMA instruction) that conventional microprocessors execute using a single atomic execution unit (such as an FMA unit). In flow block 710, an indication of the instruction (for example, the opcode) indicates whether the instruction calls for performance of a fused compound arithmetic operation and whether the operation is suitable for split execution by separate execution units. If so, then in flow block 715, the instruction translator 20 reads the configurable signal source 21, which provides a configuration setting that specifies a mode of split execution.

In particular, "unchained" and "chained" modes of split execution are provided. In the "unchained" mode, separate microinstructions are issued to each of two or more execution units performing the split execution of the compound arithmetic operation. In the "chained" mode, a single microinstruction is issued to a first execution unit performing a first part of the split execution of the compound arithmetic operation. The second execution unit begins executing a second part of the compound arithmetic operation after receiving intermediate results from a first execution unit, without requiring its own microinstruction.

If the configurable signal source 21 indicates an unchained mode of execution, then in flow block 7251, the instruction translator 20 issues a first microinstruction $\mu\text{-Op}_1$ 726 and subsequently issues a second microinstruction $\mu\text{-Op}_2$ 727. Otherwise, if the configurable signal source 21 indicates a chained mode of execution, the instruction translator 20 issues a single microinstruction $\mu\text{-Op}_{single}$ 731.

If the scheduler 25 has received first and second microinstructions $\mu\text{-Op}_1$ 726 and $\mu\text{-Op}_2$ 727, which indicate an unchained mode of execution, then it dispatches $\mu\text{-Op}_1$ 726 to an execution unit 735 of a first type (hereinafter, "stage one execution unit 735") that is operable to perform a first part or sub-operation of the fused compound arithmetic operation. For example, if the microinstruction specifies an FMA operation, then in one implementation, $\mu\text{-Op}_1$ 726 is the FMA1 microinstruction described in the '817 application, and the stage one execution unit 735 is a multiplier 635 configured with the capability of performing FMA1. When the stage one execution unit 735 completes the first sub-operation, it stores an intermediate result 736 in the reorder buffer and/or temporary registers 750, and/or forwards the intermediate result 736 along forwarding data path 40 to an execution unit 740 of a second type (hereinafter, "stage two execution unit 740") that is operable to perform a second part or sub-operation of the fused compound arithmetic operation. Additionally, the stage one execution unit 735 may store indicators to the temporary storage 55. For example, if the microinstruction specifies an FMA operation, then in one implementation, $\mu$-$Op_2$ 727 is the FMA2 microinstruction described in the '817 application, and the stage two execution unit 740 is an adder 640 configured with the capability of performing FMA2. The stage two execution unit 740, however, does not perform the second sub-operation until the scheduler 25 dispatches $\mu$-$Op_2$ 727.

As explained in the '817 application, using the configuration described above to perform an FMA operation in a non-atomic fashion provides several benefits. One especially significant advantage is that if the multiplier 635 and adder 640 are not sharing the same dispatch port, then both the multiplier 635 and adder 640 can be utilized to execute microinstructions at the same time. More specifically, the multiplier 635 and adder 640, for example, each receive a microinstruction in the same clock cycle. Up to double the instruction throughput is possible in such a configuration than would be possible were a single atomic FMA execution unit substituted for the multiplier 635 and adder 640. This is because while the specialized FMA1 microinstruction is dispatched to the multiplier 635, another microinstruction may be simultaneously dispatched to the adder 640. Furthermore, the FMA1 and FMA2 microinstructions can be dispatched and executed in a temporally and/or physically dissociated manner.

But this unchained mode of split execution provides a lesser advantage when there are fewer dispatch ports than there are multipliers 735 and adders 740 and the pipeline is saturated with FMA operations. This is because the adder 640, when operating in the unchained mode of execution, requires the FMA2 microinstruction to complete the FMA operation. Take, for example, a case in which a multiplier 635 and an adder 640 share the same dispatch port 725. The requirement of FMA2 to complete the FMA operation means that the dispatch port 725 associated with the adder 640 is unable to simultaneously dispatch another microinstruction to the multiplier 635. This, in turn, leaves the multiplier 635 underutilized.

Figure 4:
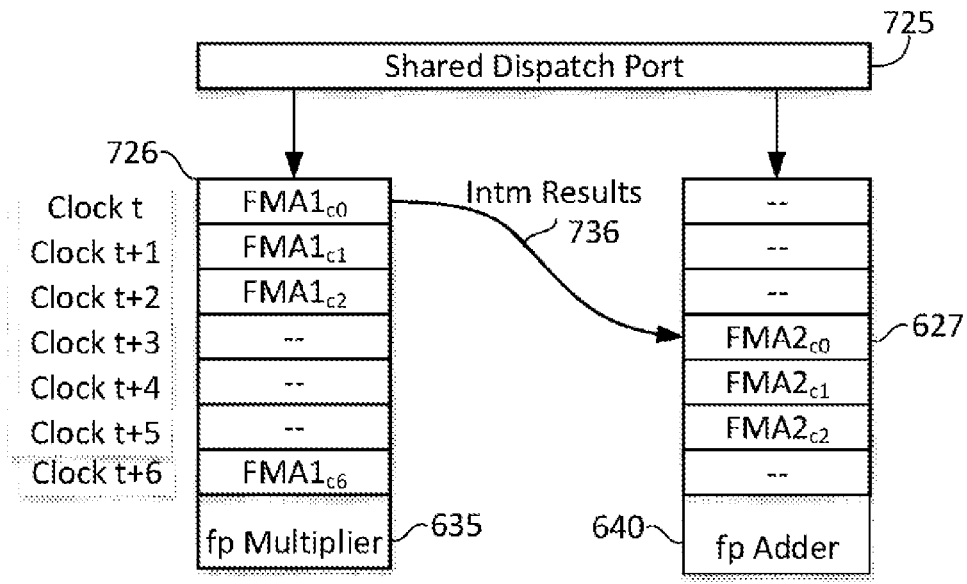
FIG. 4 illustrates a flow of unchained split execution FMA microinstructions to a multiplier and adder that share a dispatch port.

FIG. 4 illustrates this limitation with a sequence of unchained FMA1 and FMA2 microinstructions dispatched to a multiplier 635 and an adder 640 sharing a dispatch port 725. In clock cycles t through t+2, three successive FMA1 microinstructions, each associated with a distinct FMA operation and each taking three clock cycles for the FMA1 sub-operation to complete, are dispatched through dispatch port 725 for execution by the multiplier 635. Later, in clock cycles t+3 through t+5, three successive FMA2 microinstructions are dispatched through dispatch port 725 to the adder 640 to perform the FMA2 sub-operations that will complete (and produce final results for) the corresponding FMA operations. Subscripts c0, c1, and c2 indicate the pairing relationships between the FMA1 and FMA2 sub-operations as well as the clock cycles during which the FMA1 sub-operation begins executing.

In clock cycles t+0 through t+2, the adder 640 is at least partially idle. It is unable to simultaneously begin executing other microinstructions because the dispatch port 725 is then dispatching FMA1 instructions and only one microinstruction can be dispatched through the dispatch port 725 at a time. Likewise, the multiplier 635 is at least partially idle during clock cycles t+3 through t+5. It is unable to begin executing microinstructions at the same time that the adder 640 begins executing the FMA2 microinstructions. The underutilization of the adder 640 is illustrated by the pipeline holes (i.e., unallocated pipeline slots) in clock cycles t through t+2 and of the multiplier 635 in clock cycles t+3 through t+5.

To overcome this limitation, the microprocessor 10 provides a chained mode of execution. Returning to decision block 720 of FIG. 3, if the configurable signal source 21 indicates a chained mode of execution, then in flow block 730 the instruction translator 20 issues, and subsequently the scheduler 25 dispatches, a single fused split execution of a compound arithmetic operation microinstruction 731 (for example, the single fused FMA (sFMA) microinstruction of FIG. 5) to the first-stage execution unit 735 (e.g., the floating point multiplier 635). In this context, "single" refers to the provision of only one microinstruction to perform the arithmetic that produces a final result of the fused compound arithmetic operation, even though more than one execution unit is utilized to perform that arithmetic, and even though the execution units perform different stages of that arithmetic.

In flow block 745, the scheduler 25 reserves an execution unit 740 of the second type (e.g., a floating point adder 640) so that it will be available to perform a second part of the fused compound arithmetic operation. The scheduler 25 "reserves" the execution unit 740 by not dispatching a microinstruction through the dispatch port 725 associated with the reserved execution unit 740 that will compete with any resources (e.g., the execution unit 740 itself, the dispatch port, the operand bus, the result bus to be used by the execution unit 740, a shared "done signal" resource, etc.) needed to perform the second part of the fused compound arithmetic operation. The scheduler 25 may, however, dispatch a microinstruction through the associated dispatch port that will not compete with any resources needed to perform the second part of the fused compound arithmetic operation.

Whether a microinstruction would compete with the resources needed by the execution unit 740 depends on the latency of the microinstruction as well as the resources that are available to meet the needs of both the execution unit 740 and any other execution units sharing the same port. If the port-sharing execution unit would place its results on the result bus in a different clock cycle than the execution unit 740 needed it to place its own results on the bus, then the port-sharing execution unit can begin executing a microinstruction at the same time that the execution unit 740 begins executing the second part of the fused compound arithmetic operation. Alternatively, if more than one result bus is provided—for example, a single-cycle result bus in addition to the primary result bus—to the group of execution units sharing the port, and the port-sharing execution unit has access to the additional result bus, then it can begin executing a microinstruction at the same time that the execution unit 740 begins executing the second part of the fused compound arithmetic operation.

Also, if the port-sharing execution unit does not need to place any results on the result bus, then it can begin executing a microinstruction at the same time that the execution unit 740 begins executing the second part of the fused compound arithmetic operation. For example, the scheduler 25 may dispatch another sFMA microinstruction 731 through the associated dispatch port at the same time that the reserved adder is to begin executing the second part of FMA operation. The resulting advantage is illustrated in FIG. 5.

Figure 5:
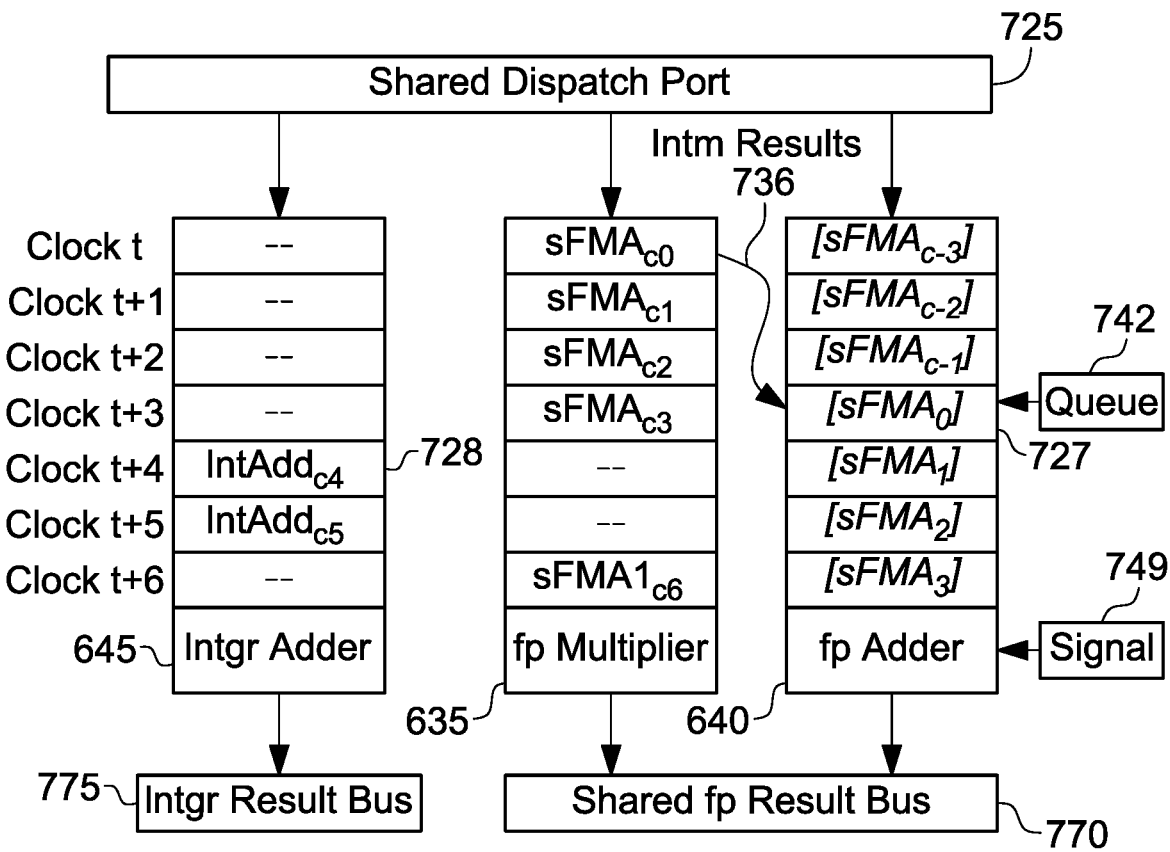
FIG. 5 illustrates a flow of chained FMA split-execution microinstructions to a multiplier and adder that share a dispatch port.

FIG. 5 depicts three execution units—an integer adder 645, a floating point multiplier 635, and a floating point adder 640—sharing the dispatch port 725. The floating point multiplier 635 and floating point adder 640 also share a floating point result bus 770. The integer adder 645 writes results to an integer result bus 775 that is distinct from the floating point result bus 770. In clock cycles t through t+3, four successive sFMA microinstructions are dispatched. Each sFMA microinstruction is associated with a distinct FMA operation, and each FMA operation is split into first and second parts to be executed by a respective multiplier and adder. Because the multiplier, in one implementation, takes three clock cycles to complete its part of the FMA operation, an adder 640 is reserved at clock cycles t+3 through t+6 to begin performing the second part of each FMA operation.

In both the chained and unchained modes of execution, the adder 640 receives intermediate results 736 from the multiplier 635. In one implementation, the intermediate result comprises a fully precise result of an intermediate calculation. In another implementation, the intermediate result comprises the most significant bits (MSBs) of the result of an intermediate calculation together with a plurality of calculation control indicators, as described in the '817 application. In one implementation, the calculation control indicators comprise an end-around-carry indicator (E), a sticky bit indicator (S), a round indicator (R), an overflow indicator (O), an underflow indicator (U), and an indication (Z) of how much of the compound arithmetic operation was performed by the multiplier 635. In another implementation, the calculation control indicators also include details that would otherwise be encoded in a microinstruction opcode, such as an indication of the data size of the desired result.

In one implementation of the chained mode of execution, the adder 640 also receives one or more chaining control signals (from the multiplier 635 over signal path 749 in one implementation and from the scheduler 25 in another implementation) that directs it to begin executing the second part of the FMA operation (sFMA) even though it has not received an actionable microinstruction to execute. A queue 742 or other suitable operand-sampling circuit supplies the adder 640 with any necessary operands (e.g., the accumulant operand C of the FMA operation A*B±C) not forwarded to it by the multiplier 635. In an alternative implementation, the adder 640 detects the sFMA instruction when it is issued to the multiplier 635 and sets a flag that causes it to begin executing the sFMA operation at the proper clock cycle.

Advantageously, the multiplier 635 and the adder 640 on the shared dispatch port 725 are operable to simultaneously execute FMA instructions without competing for any of the resources associated with its dispatch-port-sharing group of execution units, including the dispatch port 725, the operand bus, and the result bus 770. There is no competition at the dispatch port 725 because the adder 640 does not need a microinstruction to execute the second part of the FMA operation. There is no competition with respect to reading operands because the queue 742 supplies the accumulant operand to the adder 640. There is also no competition for the result bus 770 because the multiplier 635 forwards the results directly to the adder 640 without utilizing the result bus 770.

The chained mode of execution provides a particularly large advantage when the pipeline is saturated with sFMA microinstructions. This is because the microprocessor is configured so that a multiplier 635 can begin executing the first part of a new FMA operation while an adder 640 begins executing the second part of a previous FMA operation, without competing for shared resources.

The chained mode of execution can provide advantages with other mixes of instructions, as well. FIG. 5 illustrates two integer add microinstructions 728 executing in clock cycles t+4 and t+5 by an integer adder 645 at the same time that the dispatch-port-sharing floating point adder 640 is execution the second parts of successive FMA operations. Because the adder 640 does not need access to the dispatch port 725 or operand bus to perform the second parts of the FMA operations, the scheduler is free to dispatch integer add microinstructions to the integer adder 645 to execute during clock cycles t+4 and t+5. Because the integer adder 645 and floating point adder 640 write to separate result busses 775 and 770, there is no competition for result bus resources.

Figure 6:
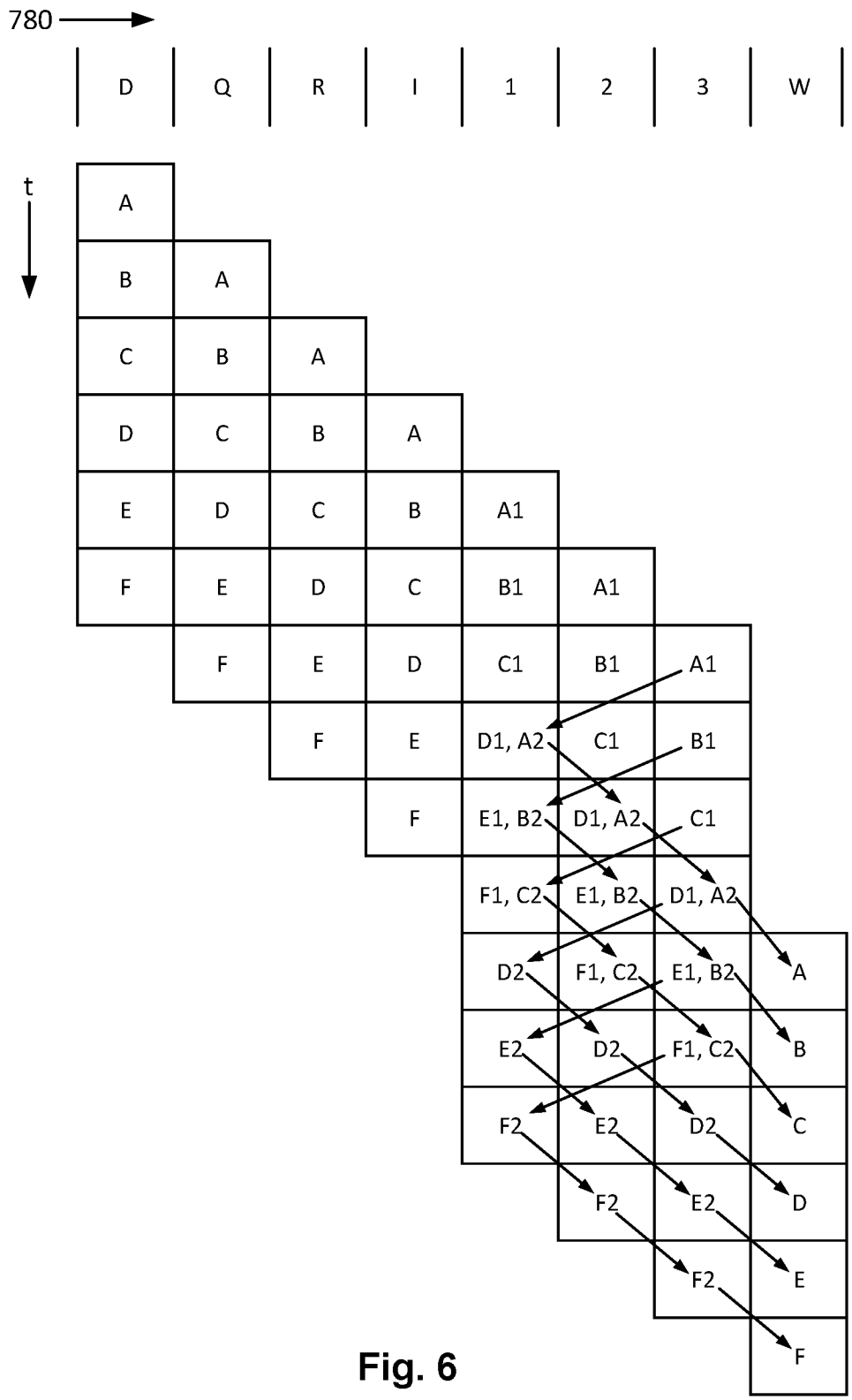
FIG. 6 is diagram illustrating the progression of six chained FMA split-execution microinstructions designated A through F through an execution pipeline.

FIG. 6 is diagram illustrating the progression of six chained FMA microinstructions designated A through F through an execution pipeline 780 over time t. Eight pipeline stages are illustrated, including pre-execution stages D, Q R and I, which includes dispatch and reading from a register file, three execution stages 1-3, and a writeback stage W. For example, after FMA microinstruction A progresses through stages D, Q, R and I, the multiplier 635 begins executing FMA microinstruction A—here denoted as A1—for three execution clock cycles represented by execution stages 1, 2 and 3. After completing execution stage 3, the intermediate results are transferred to the adder 640, where execution commences at execution stage 1 of the second part of the FMA operation. Here, microinstruction A is denoted as A2. At the same time A2 executes through execution stages 1, 2, and 3 of the adder 640, another chained FMA microinstruction D1 simultaneously executes through execution stages 1, 2 and 3 of the multiplier 635. Each box in FIG. 6 filled with two microinstructions illustrates the use of two dispatch-port-sharing execution units at the same time.

Obtaining higher throughput, as above, requires that there be microinstructions available to dispatch that can begin utilizing an execution unit while a dispatch-port-sharing adder 640 begins executing some part of a chained FMA operation. The fewer such microinstructions are available, the smaller the advantage.

With some instruction or microinstruction mixes, the advantages of an unchained mode of split execution (e.g., flexibility in scheduling the FMA2 operation, flexibility in pairing multipliers and adders together) will exceed the diminished advantages of a chained mode of split execution. For example, in an implementation with fixed static pairings of multipliers and adders for FMA operations, differing numbers of multiply and add units would constrain how many multipliers and adders can be chained together. As another example, where the multiply and add units share the same result bus, an instruction sequence that alternates between multiply and FMA operations (e.g., multiply-FMA-multiply-FMA) will present scheduling conflicts because the chained FMA forces a rigid, predetermined timing in reservation of the result bus resource for completing the second portion of the FMA. In the unchained mode, by contrast, the second portion of each FMA operation can be delayed arbitrarily. The scheduler is free to shuffle or reorder these alternating multiply-FMA sequences in more optimal ways.

As set forth above, a microprocessor capable of both chained and unchained modes of split execution provides advantages over a microprocessor configured to only perform only one of these modes of split execution.

In one implementation, a chained mode of execution is not limited to execution units sharing a common dispatch port 725. FIG. 2 illustrates two chained paths 661 and 662. Chained path 661 comprises an intermediate result forwarding path 40 (FIG. 1) and chaining control signal path 749 (FIG. 3) between the multiplier 635 and the adder 640 of multimedia group 730. While chaining configurations between execution units within a group that share a common dispatch port are likely to be preferable in most cases, some implementations may feature chaining between groups. This is illustrated in FIG. 2's chained path 662, which comprises an intermediate result forwarding path 40 and chaining control signal path 749 between the multiplier 635 of multimedia group 630 and an adder 640 of multimedia group 631.

Also, in some implementations, execution units operable to perform a split execution of a compound arithmetic operation are statically paired together. In one static pairing implementation, for example, a multiplier 635 that performs an FMA1 sub-operation is always paired with a particular adder 640 (and no other) to perform the FMA2 sub-operation. But in other implementations, execution units operable to perform a split execution of a compound arithmetic operation are dynamically paired together. In one dynamic pairing implementation, for example, the intermediate results of a multiplier's FMA1 sub-operation are forwarded to a plurality of adders 640. Only a dynamically selected one of the adders 640 (for example, an adder 640 selected by the scheduler 25) reads the intermediate results and begins performing the FMA2 sub-operation.

Figure 7:
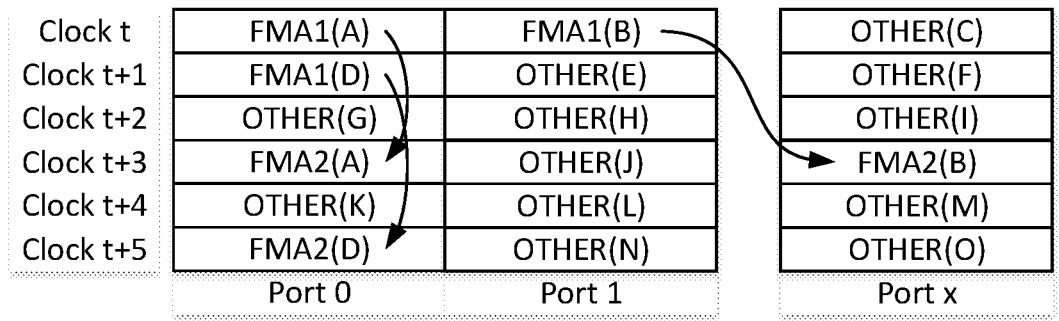
FIG. 7 illustrates a flow of unchained FMA split-execution microinstructions across a plurality of ports.
Figure 8:
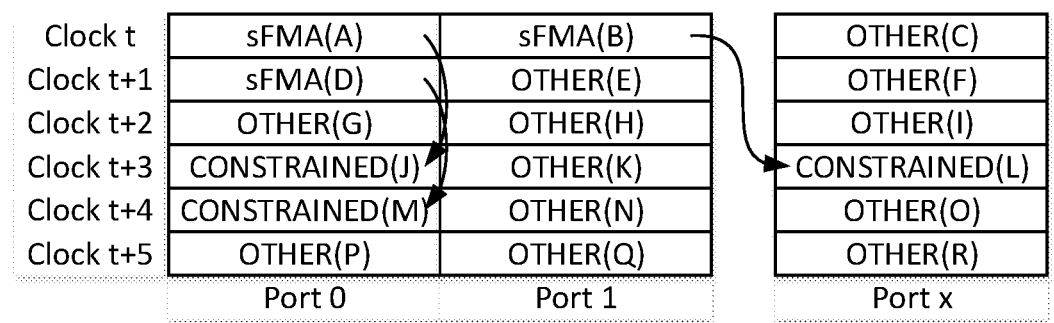
FIG. 8 illustrates a flow of chained FMA split-execution microinstructions across a plurality of ports.

FIGS. 7 and 8 provide illustrative examples of assignments of microinstructions by the scheduler 25 to various ones of its ports. FIG. 7 illustrates an assignment of FMA1 and FMA2 microinstructions (amidst several OTHER microinstructions) for an unchained mode of execution of FMA operations. FIG. 8, by contrast, illustrates the assignment of sFMA microinstructions (also amidst several OTHER and CONSTRAINED microinstructions) for a chained mode of execution. The letters in the parentheticals represent the program instructions from which the microinstructions were translated. For example, FMA1(A) and FMA2(A) are two split-execution microinstructions translated from a single FMA program instruction A. Likewise, FMA1(B) and FMA2(B) are two split-execution microinstructions translated from a single FMA program instruction B.

In the unchained mode example of FIG. 7, the scheduler 25 assigns FMA1(A) to Port 0 and FMA1(B) to Port 1—the first parts of FMA operations A and B—to begin execution in clock t. The scheduler 25 assigns FMA2(A) to Port 0 and FMA2(B) to Port x to begin executing three clock cycles later. In keeping with the pipelined nature of the execution units, the scheduler assigns FMA1(D) to Port 0 to begin execution in clock t+1. Advantageously in this unchained mode of execution, the scheduler 25 has flexibility in determining when to dispatch the FMA2 microinstruction. So it schedules FMA2(D) to execute at port 0 four clock cycles later, at clock t+5. Meanwhile, the scheduler 25 fills the other time slots of the ports 0 through x with other microinstructions performing other operations C and E-O.

In the chained mode example of FIG. 8, the scheduler 25 assigns sFMA(A) to Port 0 and sFMA(B) to Port 1. Subsequently—in this example, at clock t+3—the scheduler 25 reserves a paired adder 640 at Port 0 to complete the sFMA(A) operation and another paired adder 640 at port x to complete the sFMA(B) operation. Reserving an adder 640 associated with a port constrains the types of microinstructions that the scheduler 25 can dispatch to that port. In short, the scheduler 25 is configured to dispatch microinstructions to ports whose adders 740 are reserved that will not compete with the resources (including the result bus) that the adder 640 needs to complete the sFMA operation. Examples include other sFMA microinstructions and microinstructions with different latencies such as a simple floating point store operation or a simple floating point absolute value.

Conclusion

Certain advantages are realized by this invention. It provides IEEE specification compatibility and correctness of desired FMA arithmetic result not evidently provided by other implementations, particularly with respect to IEEE rounding requirements.

This invention maximizes availability of independent arithmetic functional units for instruction dispatch by retaining separately available multiplier and adder units, permitting the computer processor to more fully exploit ILP for a particular invested implementation cost. Stated differently, it allows maximal concurrent utilization of minimally implemented hardware, to complete the most frequently expected calculations as fast as possible, as is desirous. This enhances throughput of arithmetic results.

As a result, the number of such provided multiply and adder functional units may be more flexibly configured according to desired overall performance and ILP capability of the required system, with less implementation cost per functional unit than an entire, monolithic FMA hardware. The ability of a computer system to reorder microinstructions is thus enhanced, with reduced cost and power consumption.

Although the current implementation is adapted to superscalar, out-of-order instruction dispatch, other implementations may be adapted to in-order instruction dispatch, for example, by removal of the rounding cache and by provision of a data forwarding network from a provided multiply computational unit to a separate adder computational unit.

This invention is applicable to SIMD implementations of FMA calculations, which are sometimes referred to as a vector instruction type or vector FMA calculation, in which case there would be multiple instances of modified multipliers and multiple instances of modified adders. In one embodiment, a single rounding cache serves the needs of an SIMD application of the invention. In another embodiment, multiple rounding caches are provided to serve SIMD applications.

Although the current invention is described primarily in relation to the performance of a floating point fused multiply add calculation requiring a multiply calculation incorporating or followed by an addition or accumulation, other implementations may apply the methods of this invention, particularly with respect to the communication of intermediate result values and chaining control signals, to calculations or computations requiring more than two chained arithmetic operations, to different arithmetic operations, or performing those arithmetic operations in a different order. For example, it may be desirous to apply these methods to other compound arithmetic operations (i.e., arithmetic operations involving two or more arithmetic operators or three or more operands), such as chained calculations of multiply-multiply-add or multiply-add-add, to obtain increased arithmetic accuracy or increased computational throughput. Moreover, some aspects of the present invention—for example, the subdivision of an integer operation that rounds to a particular bit position into first and second sub-operations, the first of which produces an unrounded intermediate result, and the second of which generates a rounded final result from the unrounded intermediate result—are applicable to integer arithmetic. These other implementations may also record different status bits to a cache mechanism as needed.

It will be understood that the current specification describes the use of rounding bits and other internal bits for the sake of convenience, and that the invention is equally applicable to other forms of indicators, including encoded representations of rounding-related or calculation-control variables.

Furthermore, it will be understood that the term "instruction" encompasses both "architectural instructions" and the "microinstructions" into which they might be translated or transformed. Likewise, the term "instruction execution unit" does not exclusively refer to embodiments in which the microprocessor directly executes architectural instructions (i.e., ISA machine code) without first translating or transforming it into microinstructions. As a microinstruction is a type of instruction, so "instruction execution unit" also encompasses embodiments in which the microprocessor first translates or transforms the ISA instruction into microinstructions, and the instruction execution units always and only execute the microinstructions.

It will also be understood that the functional blocks illustrated in the drawings may be described interchangeably as modules, circuits, subcircuits, logic, and other words commonly used within the fields of digital logic and microprocessor design to designate digital logic embodied within wires, transistors and/or other physical structures that performs one or more functions. It will also be understood that the invention encompasses alternative implementations that distribute the functions described in the specification differently than illustrated herein.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A microprocessor comprising:
first and second instruction execution units, each instruction execution unit comprising a characteristic set of logic circuitry provided to execute any of a designated set of microinstructions of a first type delivered to it for completion, and to produce final results thereof;
a plurality of dispatch ports, each coupled to a corresponding one of the first and second instruction execution units; and
a scheduler, determining to which one of the dispatch ports a microinstruction is bound, and the clock cycle during which the microinstruction is dispatched;
wherein the first and second instruction execution units are also configured to perform chained and non-chained modes of split execution of a fused compound arithmetic operation, one in which the first instruction execution unit, after receiving a split-execution microinstruction, executes only a first part of the fused compound arithmetic operation and produces an intermediate result thereof, and in which the second instruction execution unit receives the intermediate result and executes a second part of the fused compound arithmetic operation to produce a final result;
wherein in the non-chained mode of split execution, first and second non-chained split-execution microinstructions are issued by the scheduler to the first and second instruction execution units, respectively, to execute the first part and the second part of the fused compound arithmetic operation;
wherein in the chained mode of split execution, a single chained split-execution microinstruction is issued by the scheduler to the first instruction execution unit to execute the first part of the fused compound arithmetic operation, and no corresponding microinstruction is issued by the scheduler to the second instruction execution unit, wherein the second instruction execution unit starts to execute the second part of the fused compound arithmetic operation after receiving the intermediate result from the first instruction execution unit, wherein the scheduler reserves the second instruction execution unit for executing the second part of the fused compound arithmetic operation by not dispatching a microinstruction through the dispatch port corresponding to the second instruction execution unit, and wherein when the second instruction execution unit detects that the single chained split-execution microinstruction is issued to the first instruction execution unit, the second instruction execution unit sets a flag that causes it to begin executing the fused compound arithmetic operation at the proper clock cycle.

2. The microprocessor of claim 1, further comprising a configurable signal source that stores a configuration setting to specify the mode of split execution.

3. The microprocessor of claim 2, wherein the microprocessor is configured to issue either the first and second non-chained split-execution microinstructions, or the single chained split-execution microinstruction, in accordance with the configuration setting, in response to an instruction specifying the compound arithmetic operation.

4. The microprocessor of claim 2, further comprising a translator configured to translate an instruction specifying the compound arithmetic operation in accordance with the configuration setting into either the first and second non-chained split-execution microinstructions for performing the non-chained mode of split execution, or into a single chained split-execution microinstruction for performing the chained mode of split execution.

5. The microprocessor of claim 2, wherein the configuration setting is configured to be set by supervisory software.

* * * * *